United States Patent
Ha

(10) Patent No.: US 12,111,633 B2
(45) Date of Patent: Oct. 8, 2024

(54) METHOD, SYSTEM, AND NON-TRANSITORY COMPUTER-READABLE RECORDING MEDIUM FOR CONTROLLING A ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 300 days.

(21) Appl. No.: 17/315,641

(22) Filed: May 10, 2021

(65) Prior Publication Data

US 2022/0357721 A1    Nov. 10, 2022

(51) Int. Cl.
   *B25J 11/00*   (2006.01)
   *G05B 19/4155*   (2006.01)
   *B25J 5/00*   (2006.01)

(52) U.S. Cl.
   CPC ....... *G05B 19/4155* (2013.01); *B25J 11/0045* (2013.01); *B25J 11/008* (2013.01); *B25J 5/00* (2013.01); *G05B 2219/40411* (2013.01); *G05B 2219/50391* (2013.01)

(58) Field of Classification Search
   CPC .. B25J 9/0003; B25J 11/0005; B25J 11/0045; B25J 11/008; B25J 13/003; B25J 11/003; G05B 2219/40411; G05B 2219/39441; G05B 2219/50391; G05B 19/4155; G06N 3/008
   See application file for complete search history.

(56) References Cited

U.S. PATENT DOCUMENTS

| | | | |
|---|---|---|---|
| 9,724,824 B1* | 8/2017 | Annan | B25J 9/1615 |
| 2018/0068321 A1* | 3/2018 | Maeda | B25J 11/0005 |
| 2018/0333862 A1* | 11/2018 | Hayashi | A63H 13/005 |
| 2021/0200189 A1* | 7/2021 | Yoo | G06V 40/172 |
| 2021/0331328 A1* | 10/2021 | Kim | G06F 21/32 |
| 2021/0373576 A1* | 12/2021 | Sohn | B25J 9/1669 |

FOREIGN PATENT DOCUMENTS

| | | | | | |
|---|---|---|---|---|---|
| JP | H07302351 | A |   | 11/1995 | |
| JP | 2016109897 | A | * | 6/2016 | ............. G10L 13/00 |
| JP | 2017182261 | A | * | 10/2017 | ............. G06F 17/30 |
| JP | 2018-118352 | A |   | 8/2018 | |
| JP | 2019079419 | A |   | 5/2019 | |
| JP | 2020027495 | A |   | 2/2020 | |
| JP | 6788710 | B1 |   | 11/2020 | |
| KR | 101083700 | B1 |   | 11/2011 | |
| KR | 10-2019-0079255 | A |   | 7/2019 | |
| KR | 10-2019-0098926 | A |   | 8/2019 | |
| KR | 1020190092337 | A |   | 8/2019 | |

* cited by examiner

*Primary Examiner* — Khoi H Tran
*Assistant Examiner* — Tanner L Cullen
(74) *Attorney, Agent, or Firm* — Dinsmore & Shohl LLP; Yongsok Choi, Esq.

(57) ABSTRACT

A method for controlling a robot is provided. The method includes the steps of: acquiring at least one of sound information and action information for a robot from a user in a serving place; determining identification information on the user on the basis of at least one of the sound information and the action information; and determining an operation to be performed by the robot on the basis of the identification information.

9 Claims, 5 Drawing Sheets

300

METHOD, SYSTEM, AND NON-TRANSITORY COMPUTER-READABLE RECORDING MEDIUM FOR CONTROLLING A ROBOT

FIELD OF THE INVENTION

The present invention relates to a method, system, and non-transitory computer-readable recording medium for controlling a robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, such a robot may acquire various information such as sound information and action information from at least one user (e.g., an employee working at a serving place or a customer using the serving place) while moving around the serving place. In some cases, an operation to be performed by the robot should be determined after a user associated with the sound information or the action information or a group to which the user belongs (e.g., an employee group or a customer group) is decided, depending on the situation.

For example, when a robot acquires a specific command from a certain user as sound information, it may be desirable that the robot performs different operations depending on whether the user is an employee or a customer, or else performs a specific operation only when the user is an employee and does not react when the user is a customer. In order for the robot to be controlled in this manner, it is necessary to determine identification information on the user before the robot performs any operation.

However, the techniques introduced so far as well as the above-described conventional technique have failed to propose a technique that ensures situational and proper control of a robot even if a user does not perform cumbersome operations on the robot (e.g., touch inputs or the like for authenticating that the user is an employee) by determining, when sound information and/or action information for the robot is acquired from the user, identification information on the user on the basis of the sound information and/or the action information, and determining an operation to be performed by the robot on the basis of the identification information.

SUMMARY OF THE INVENTION

One object of the present invention is to solve all the above-described problems in the prior art.

Another object of the invention is to acquire at least one of sound information and action information for a robot from a user in a serving place, determine identification information on the user on the basis of at least one of the sound information and the action information, and determine an operation to be performed by the robot on the basis of the identification information.

Yet another object of the invention is to determine an operation to be performed by a robot on the basis of identification information on a user as determined above, thereby ensuring situational and proper control of the robot even if the user does not perform cumbersome operations on the robot.

The representative configurations of the invention to achieve the above objects are described below.

According to one aspect of the invention, there is provided a method for controlling a robot, the method comprising the steps of: acquiring at least one of sound information and action information for a robot from a user in a serving place; determining identification information on the user on the basis of at least one of the sound information and the action information; and determining an operation to be performed by the robot on the basis of the identification information.

According to another aspect of the invention, there is provided a system for controlling a robot, the system comprising: an information acquisition unit configured to acquire at least one of sound information and action information for a robot from a user in a serving place; an identification information determination unit configured to determine identification information on the user on the basis of at least one of the sound information and the action information; and an operation determination unit configured to determine an operation to be performed by the robot on the basis of the identification information.

In addition, there are further provided other methods and systems to implement the invention, as well as non-transitory computer-readable recording media having stored thereon computer programs for executing the methods.

According to the invention, it is possible to acquire at least one of sound information and action information for a robot from a user in a serving place, determine identification information on the user on the basis of at least one of the sound information and the action information, and determine an operation to be performed by the robot on the basis of the identification information.

According to the invention, it is possible to determine an operation to be performed by a robot on the basis of identification information on a user as determined above, thereby ensuring situational and proper control of the robot even if the user does not perform cumbersome operations on the robot.

DETAILED DESCRIPTION OF THE INVENTION

Figure 1:
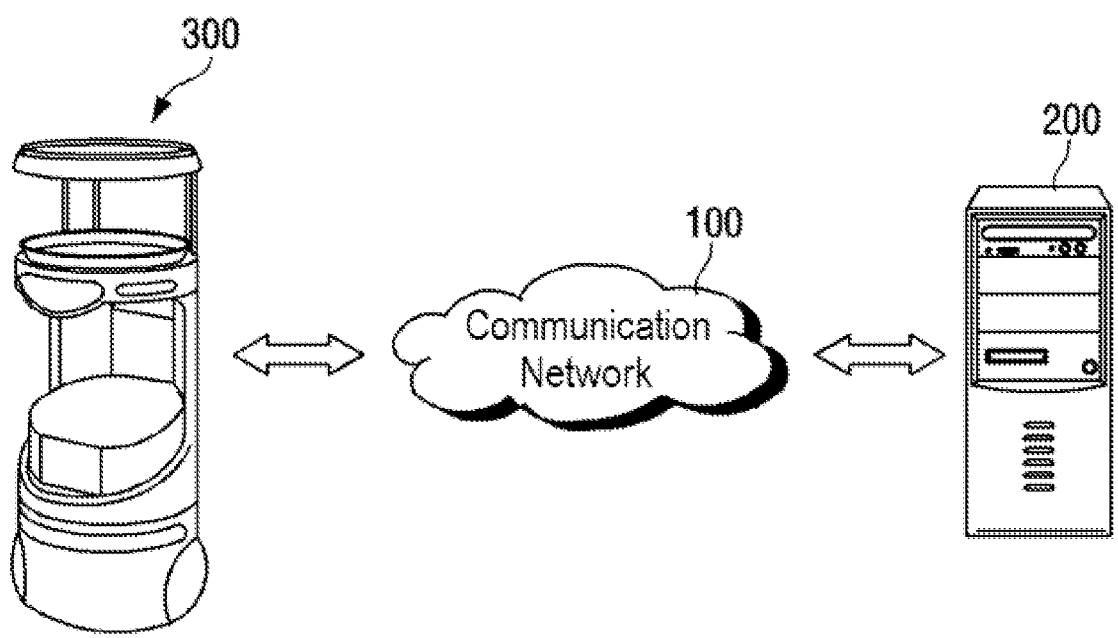
FIG. 1 schematically shows the configuration of an entire system for controlling a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a robot according to one embodiment of the invention.

As shown in FIG. 1, the entire system according to one embodiment of the invention may comprise a communication network 100, a robot control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may communicate with the robot 300 to be described below via the communication network 100, and may function to: acquire at least one of sound information and action information for the robot 300 from a user in a serving place; determine identification information on the user on the basis of at least one of the sound information and the action information; and determine an operation to be performed by the robot 300 on the basis of the identification information.

The configuration and functions of the robot control system 200 according to the invention will be discussed in more detail below.

Next, the robot 300 according to one embodiment of the invention is a device that may communicate with the robot control system 200 via the communication network 100, and may autonomously perform predetermined functions or assigned tasks (e.g., serving food, retrieving containers, etc.) without any operation of a user (e.g., an employee or a customer). The robot 300 may include at least one of a module (e.g., a grab or a robotic arm module) for loading and unloading an object (e.g., a food tray), an image acquisition module (e.g., a visible light camera or an infrared camera) for acquiring images of surroundings, a sound acquisition module (e.g., a microphone) for acquiring sounds of surroundings, a display and speaker module for providing images and sounds, and a drive module (e.g., a motor) for moving the robot 300. For example, the robot 300 may have characteristics or functions similar to those of at least one of a guide robot, a serving robot, a transport robot, a cleaning robot, a medical robot, an entertainment robot, a pet robot, and an unmanned flying robot.

Meanwhile, according to one embodiment of the invention, the robot 300 may include an application (not shown) for performing control of the robot 300 according to the invention. The application may be downloaded from the robot control system 200 or an external application distribution server (not shown). Meanwhile, the characteristics of the application may be generally similar to those of an information acquisition unit 210, an identification information determination unit 220, an operation determination unit 230, a communication unit 240, and a control unit 250 of the robot control system 200 to be described below. Here, at least a part of the application may be replaced with a hardware device or a firmware device that may perform a substantially equal or equivalent function, as necessary.

Configuration of the Robot Control System

Hereinafter, the internal configuration of the robot control system 200 crucial for implementing the invention and the functions of the respective components thereof will be discussed.

Figure 2:
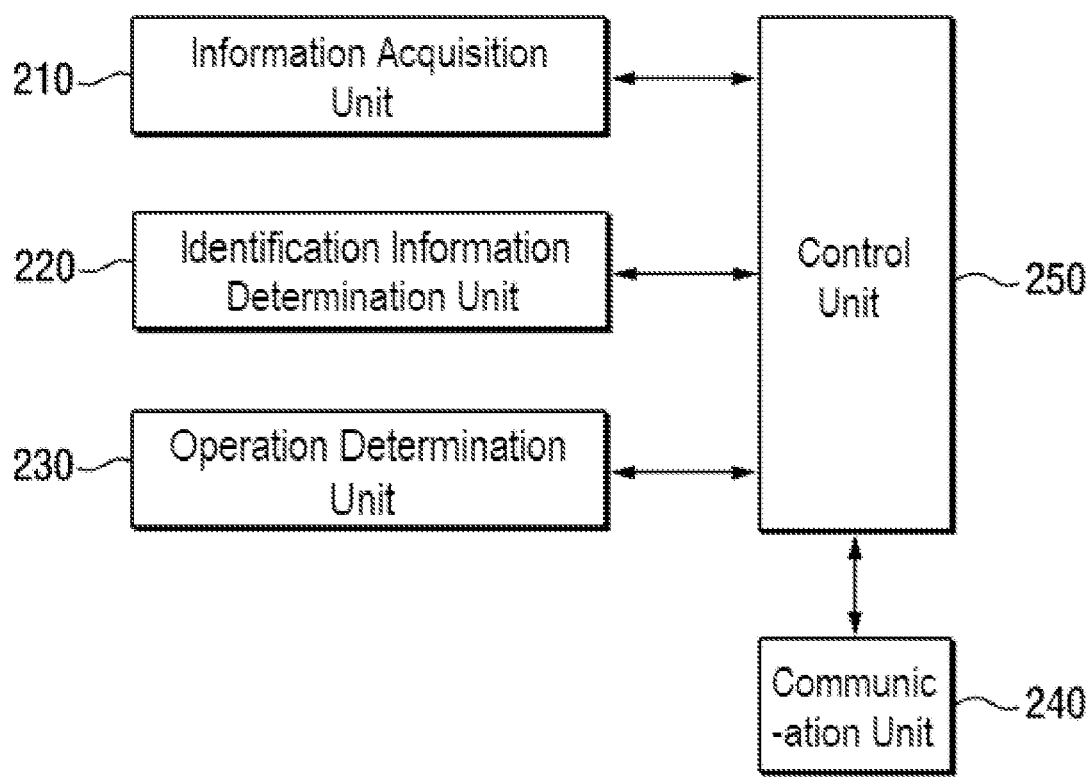
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise an information acquisition unit 210, an identification information determination unit 220, an operation determination unit 230, a communication unit 240, and a control unit 250. According to one embodiment of the invention, at least some of the information acquisition unit 210, the identification information determination unit 220, the operation determination unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the robot 300 or an external system (not shown), as necessary. Further, in some cases, all of the functions and components of the robot control system 200 may be implemented or included in the robot 300.

First, the information acquisition unit 210 according to one embodiment of the invention may function to acquire at least one of sound information and action information for the robot 300 from a user in a serving place.

Specifically, the information acquisition unit 210 according to one embodiment of the invention may include a sound acquisition module (not shown) such as a microphone. According to one embodiment of the invention, the sound acquisition module may be coupled to a main body 510 of the robot 300 (see FIG. 4), and may receive a sound generated from at least one user (e.g., an employee or a customer) around the robot 300. Further, the information acquisition unit 210 according to one embodiment of the invention may process and recognize the received sound to acquire sound information for the robot 300. To this end, the information acquisition unit 210 according to one embodiment of the invention may use known sound processing techniques to perform preprocessing or noise removal on the sound received by the sound acquisition module.

Here, when the information acquisition unit 210 according to one embodiment of the invention recognizes the sound, it should be understood that speech and/or voice included in the sound can be recognized. Further, the acquired sound information may refer to a command for calling the robot 300 or assigning a specific task to the robot 300, but may also refer to a series of commands acquired sequentially (e.g., a combination of at least one command for calling the robot 300 and at least one command for assigning a specific task to the robot 300).

Meanwhile, the information acquisition unit 210 according to one embodiment of the invention may decide whether the sound received by the sound acquisition module or the sound information corresponding to the sound is intended for the robot 300, on the basis of an intensity and/or a direction of the sound. For example, the information acquisition unit 210 according to one embodiment of the invention may determine the direction of the sound by analyzing sounds received by two or more sound acquisition modules, and may decide whether the sound or the sound information corresponding to the sound is intended for the robot 300, on the basis of the direction of the sound.

Further, the information acquisition unit 210 according to one embodiment of the invention may include an image acquisition module (not shown) such as a camera. According to one embodiment of the invention, the image acquisition module may be coupled to the main body 510 of the robot 300 (see FIG. 4), and may take images of at least one user (e.g., an employee or a customer) around the robot 300. In addition, the information acquisition unit 210 according to one embodiment of the invention may process the images taken as above and recognize an action of the user to acquire action information for the robot 300. To this end, the information acquisition unit 210 according to one embodiment of the invention may use known image processing techniques such as a convolutional neural network (CNN) based image processing algorithm and an image processing algorithm for pose estimation.

Here, the action information for the robot 300 acquired by the information acquisition unit 210 according to one embodiment of the invention may include information on a motion, pose, facial expression, gaze, and the like of the user. Further, the acquired action information may refer to an action for calling the robot 300 or assigning a specific task to the robot 300, but may also refer to a series of actions acquired sequentially (e.g., a combination of at least one action for calling the robot 300 and at least one action for assigning a specific task to the robot 300).

Meanwhile, the information acquisition unit 210 according to one embodiment of the invention may decide whether the user's action or the action information corresponding to the action is intended for the robot 300, on the basis of information on the user's gaze. For example, the information acquisition unit 210 according to one embodiment of the invention may decide whether the user's action or the action information corresponding to the action is intended for the robot 300, on the basis of whether the user's gaze is directed to the robot 300 and how long the gaze on the robot 300 is maintained.

Next, the identification information determination unit 220 according to one embodiment of the invention may function to determine identification information on the user on the basis of at least one of the sound information and the action information for the robot 300 acquired by the information acquisition unit 210 according to one embodiment of the invention.

Specifically, when the user who provides the sound information and/or the action information to the robot 300 is specified (i.e., when it is decided that the sound information and/or the action information acquired from the user is intended for the robot 300), the identification information determination unit 220 according to one embodiment of the invention may determine the identification information on the user on the basis of the sound information and/or the action information.

According to one embodiment of the invention, the identification information on the user may include information on a group associated with the user, a gender of the user, an age of the user, and the like. That is, when the identification information determination unit 220 according to one embodiment of the invention determines the identification information on the user, it does not necessarily mean that the user is accurately identified, but may mean that the user is identified to a degree in which the group associated with the user can be distinguished. Here, according to one embodiment of the invention, the group associated with the user may refer to a group to which the user belongs among a plurality of groups classified according to a predetermined criterion (e.g., an employee group and a customer group).

For example, when the user is an employee and employees are classified into a first group, the identification information determination unit 220 according to one embodiment of the invention may determine the first group as the group associated with the user (i.e., as the identification information on the user). As another example, when the user is a customer (or not an employee) and customers (or non-employees) are classified into a second group, the identification information determination unit 220 according to one embodiment of the invention may determine the second group as the group associated with the user (i.e., as the identification information on the user). As yet another example, when groups classified according to roles of users (e.g., employees working at a dining room, a kitchen, or a counter of a restaurant) are determined, the identification information determination unit 220 according to one embodiment of the invention may determine the group according to the role of the user as the identification information on the user.

However, the manner of determining the identification information on the user or the group associated with the user according to one embodiment of the invention is not limited to the foregoing, and may be diversely changed as long as the objects of the invention may be achieved.

Meanwhile, the identification information determination unit 220 according to one embodiment of the invention may determine the identification information on the user by comparing at least one of the sound information and the action information for the robot 300 acquired by the information acquisition unit 210 according to one embodiment of the invention with at least one of reference sound information and reference action information, respectively.

Specifically, according to one embodiment of the invention, the reference sound information and the reference action information may refer to sound information and action information that are predefined in order to determine identification information on users. According to one embodiment of the invention, the reference sound information and/or the reference action information may be defined by a user. Furthermore, the reference sound information and/or the reference action information may be defined for each robot 300 or for each group associated with a user.

For example, the identification information determination unit 220 according to one embodiment of the invention may assist a user to register a voice, a call word, and/or an action for the user to call the robot 300 or a voice, a command, and/or an action for the user to assign a specific task to the robot 300 as reference sound information and/or reference action information for a specific group (e.g., an employee group), or to delete or modify registered reference sound information and/or reference action information. Further, the identification information determination unit 220 according to one embodiment of the invention may compare the sound information and/or the action information for the robot 300 with the reference sound information and/or the reference action information, respectively, and may determine the specific group as the group associated with the user (i.e., as the identification information on the user) when a result of the comparison shows that the degree of matching therebetween is not less than a predetermined level.

Next, the operation determination unit 230 according to one embodiment of the invention may function to determine an operation to be performed by the robot 300 on the basis of the identification information on the user determined by the identification information determination unit 220 according to one embodiment of the invention.

For example, the operation determination unit 230 according to one embodiment of the invention may differently determine the operation to be performed by the robot 300 according to whether the group associated with the user is a first group (e.g., an employee group) or a second group (e.g., a customer group).

For example, when the group associated with the user is a first group (e.g., an employee group), the operation determination unit 230 according to one embodiment of the invention may decide whether the user has called the robot 300 or has assigned a specific task to the robot 300, on the basis of at least one of the sound information and the action information for the robot 300 acquired from the user. Further, according to a result of the decision, an operation such as responding to the user's call or performing the specific task may be determined as the operation to be performed by the robot 300. In contrast, when the group associated with the user is a second group (e.g., a customer group), the operation determination unit 230 according to one embodiment of the invention may determine not reacting to the user as the operation to be performed by the robot 300, without making the above decision.

Further, the operation determination unit 230 according to one embodiment of the invention may determine the operation to be performed by the robot 300 on the basis of information on a current situation of the robot 300. For example, when the user has assigned a specific task to the robot 300 but the robot 300 is currently serving food and cannot perform the task immediately, the operation determination unit 230 according to one embodiment of the invention may determine informing the user that the assigned task cannot be performed or can be performed after the current task is finished as the operation to be performed by the robot 300.

Figure 3:
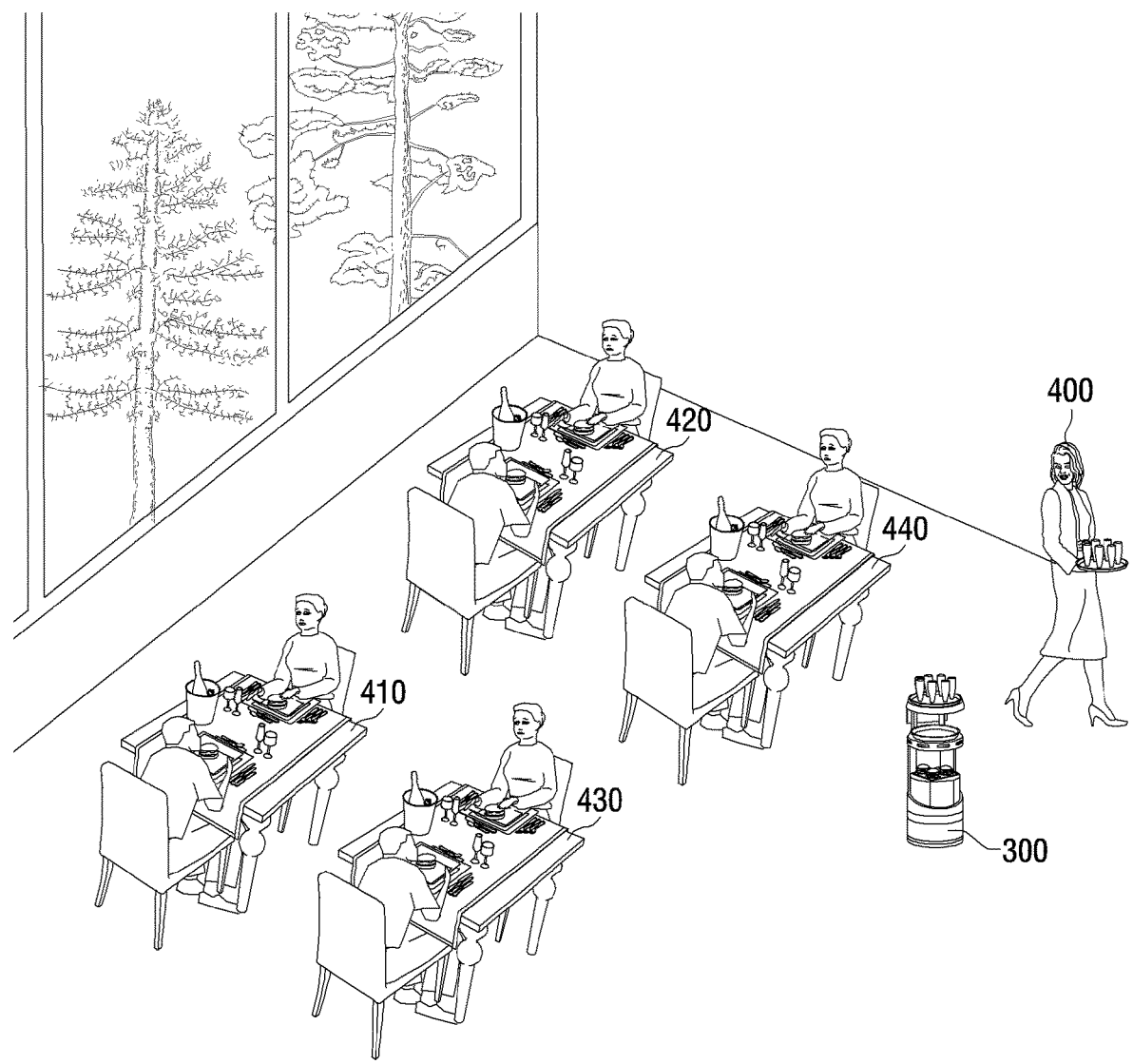
FIG. 3 illustratively shows a situation in which a robot is controlled in a serving place according to one embodiment of the invention.

FIG. 3 illustratively shows a situation in which a robot is controlled in a serving place according to one embodiment of the invention.

For example, referring to FIG. 3, when the serving place is a restaurant, the information acquisition unit 210 according to one embodiment of the invention may acquire sound information for the robot 300 (e.g., a call word "Servi!" or a command "Come here!")

from a first user 400 and a second user 440. Here, the information acquisition unit 210 according to one embodiment of the invention may decide that at least one of sound information and action information acquired from other users 410, 420, and 430 is not intended for the robot 300.

Next, the identification information determination unit 220 according to one embodiment of the invention may determine identification information on the first user 400 and the second user 440 on the basis of the sound information for the robot 300 acquired as above. For example, the identification information determination unit 220 according to one embodiment of the invention may compare the acquired sound information for the robot 300 with reference sound information (e.g., pre-registered voices) to determine a first group (e.g., an employee group) as a group associated with the first user 400 (i.e., as identification information on the first user 400), and determine a second group (e.g., a customer group) as a group associated with the second user 440 (i.e., as identification information on the second user 440).

Next, the operation determination unit 230 according to one embodiment of the invention may determine not reacting to the second user 440 as an operation to be performed by the robot 300 on the basis of the identification information determined as above. Further, the operation determination unit 230 according to one embodiment of the invention may determine an operation such as responding to a call of the first user 400 or performing a specific task assigned by the first user 400 as an operation to be performed by the robot 300, on the basis of the sound information for the robot 300 acquired from the first user 400. Here, when the robot 300 is currently serving food and cannot perform the assigned task immediately, the operation determination unit 230 according to one embodiment of the invention may determine informing the first user 400 that the assigned task cannot be performed or can be performed after the current task is finished as an operation to be performed by the robot 300.

Next, the communication unit 240 according to one embodiment of the invention may function to enable data transmission/reception from/to the information acquisition unit 210, the identification information determination unit 220, and the operation determination unit 230.

Lastly, the control unit 250 according to one embodiment of the invention may function to control data flow among the information acquisition unit 210, the identification information determination unit 220, the operation determination unit 230, and the communication unit 240. That is, the control unit 250 according to one embodiment of the invention may control data flow into/out of the robot control system 200 or data flow among the respective components of the robot control system 200, such that the information acquisition unit 210, the identification information determination unit 220, the operation determination unit 230, and the communication unit 240 may carry out their particular functions, respectively.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 4:
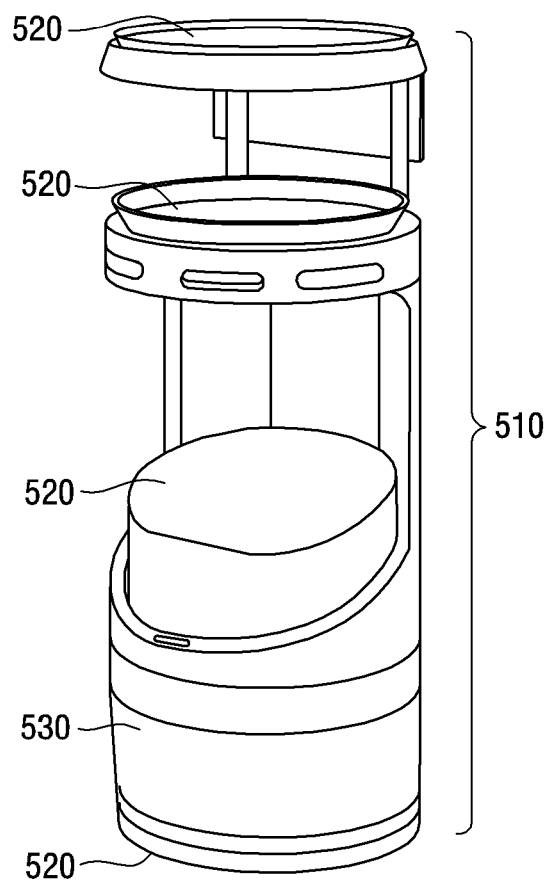
FIG. 4 illustratively shows the structure of a robot according to one embodiment of the invention.

Referring to FIG. 4, the robot 300 may comprise a main body 510, a drive unit 520, and a processor 530.

For example, the main body 510 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 5:
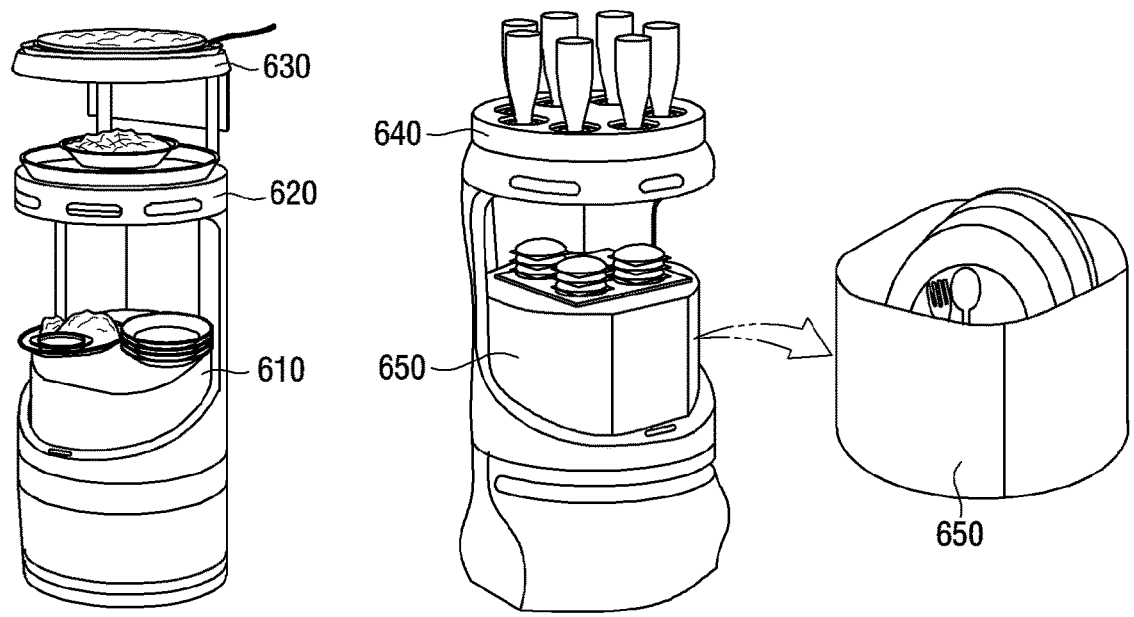
FIG. 5 illustratively shows the structure of a robot according to one embodiment of the invention.

Referring to FIG. 5, when the robot 300 is a serving robot, it may include a first space 610 and a second space 620 for providing the transported object and collecting the retrieved object. Further, the robot 300 may further include a third space 630 that is an expansion space provided via a removable pillar, and more loading spaces may be provided by adding more expansion spaces as needed. Further, the robot 300 may further include a tray 640 dedicated for the transported or retrieved object. For example, the tray 640 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 610 of the robot 300 may include a fourth space 650 that may be taken out through a lateral side of the robot 300. The fourth space 650 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 4, the main body 510 may further include an image acquisition module (e.g., a visible light camera or an infrared camera) (not shown) and a scanner module (e.g., a LIDAR sensor) for acquiring images of surroundings (e.g., customers, tables, employees, other robots 300, etc.) and information on obstacles.

Next, the drive unit 520 according to one embodiment of the invention may comprise a module for moving the main body 510 to other locations or a module for loading and unloading the transported and retrieved objects.

For example, the drive unit 520 may include a module related to electrically, mechanically, or hydraulically driven wheels, propellers, or the like as the module for moving the main body 510 to other locations, and may include a robotic arm module for mounting and conveying the transported and retrieved objects as the module for loading and unloading the transported and retrieved objects.

Next, the processor 530 according to one embodiment of the invention may be electrically connected to the drive unit 520 to perform a function of controlling the drive unit 520 (and may include a communication module for communicating with an external system). For example, the processor 530 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 530 may perform the functions of at least one of the information acquisition unit 210, the identification information determination unit 220, and the operation determination unit 230 of the robot control system 200 according to the invention (e.g., the corresponding functions may be modularized and included in the processor 530), and may function to control the drive unit 520 through communication with an external system (not shown) that performs the functions of at least one of the information acquisition unit 210, the identification information determination unit 220, and the operation determination unit 230.

Specifically, the processor 530 may function to: acquire at least one of sound information and action information for the robot 300 from a user in a serving place of the robot 300; determine identification information on the user on the basis of at least one of the sound information and the action information; and determine an operation to be performed by the robot 300 on the basis of the identification information.

Although the embodiments in which the serving place according to the invention is a restaurant have been mainly described above, it is noted that the serving place is not necessarily limited to a restaurant, and may be changed to a cafe, pub, bar, or the like without limitation as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a robot, the method comprising the steps of:
  acquiring at least one of sound information and action information from a user in a serving place, and deciding whether at least one of the sound information and the action information is intended for the robot;
  determining identification information on the user as a group classified according to a role of the user in the serving place on the basis of at least one of the sound information and the action information, in response to deciding that at least one of the sound information and the action information is intended for the robot;
  determining an operation to be performed by the robot on the basis of the identification information; and
  causing the robot to autonomously perform the determined operation,
  wherein when the group according to the role of the user is a first group consisting of users who are employees working at the serving place, the operation to be performed by the robot is determined as responding to the user's call if the sound information includes at least one command for calling the robot or the action information includes at least one action for calling the robot, or performing a specific task if the sound information includes at least one command for assigning the specific task to the robot or the action information includes at least one action for assigning the specific task to the robot, and
  wherein when the group according to the role of the user is a second group consisting of users who are not the employees, the operation to be performed by the robot is determined as not reacting to the user.

2. The method of claim 1, wherein in the step of determining the identification information, the identification information on the user is determined by comparing at least one of the sound information and the action information with at least one of reference sound information and reference action information, respectively.

3. The method of claim 2, wherein at least one of the reference sound information and the reference action information is predefined.

4. The method of claim 1, wherein in the step of determining the operation to be performed by the robot, the operation is determined on the further basis of information on a current situation of the robot.

5. A non-transitory computer-readable recording medium having stored thereon a computer program for executing the method of claim 1.

6. A system for controlling a robot, the system comprising:
  a processor configured to:
  acquire at least one of sound information and action information from a user in a serving place, and decide whether at least one of the sound information and the action information is intended for the robot;
  determine identification information on the user as a group classified according to a role of the user in the serving place on the basis of at least one of the sound information and the action information, in response to deciding that at least one of the sound information and the action information is intended for the robot; and
  determine an operation to be performed by the robot on the basis of the identification information, and cause the robot to autonomously perform the determined operation,
  wherein when the group according to the role of the user is a first group consisting of users who are employees working at the serving place, the operation to be performed by the robot is determined as responding to the user's call if the sound information includes at least one command for calling the robot or the action information includes at least one action for calling the robot, or performing a specific task if the sound information includes at least one command for assigning the specific task to the robot or the action information includes at least one action for assigning the specific task to the robot, and
  wherein when the group according to the role of the user is a second group consisting of users who are not the employees, the operation to be performed by the robot is determined as not reacting to the user.

7. The system of claim 6, wherein the processor is configured to determine the identification information on the user by comparing at least one of the sound information and the action information with at least one of reference sound information and reference action information, respectively.

8. The system of claim 7, wherein at least one of the reference sound information and the reference action information is predefined.

9. The system of claim 6, wherein the processor is configured to determine the operation to be performed by the robot on the further basis of information on a current situation of the robot.

* * * * *